Patented Feb. 21, 1933

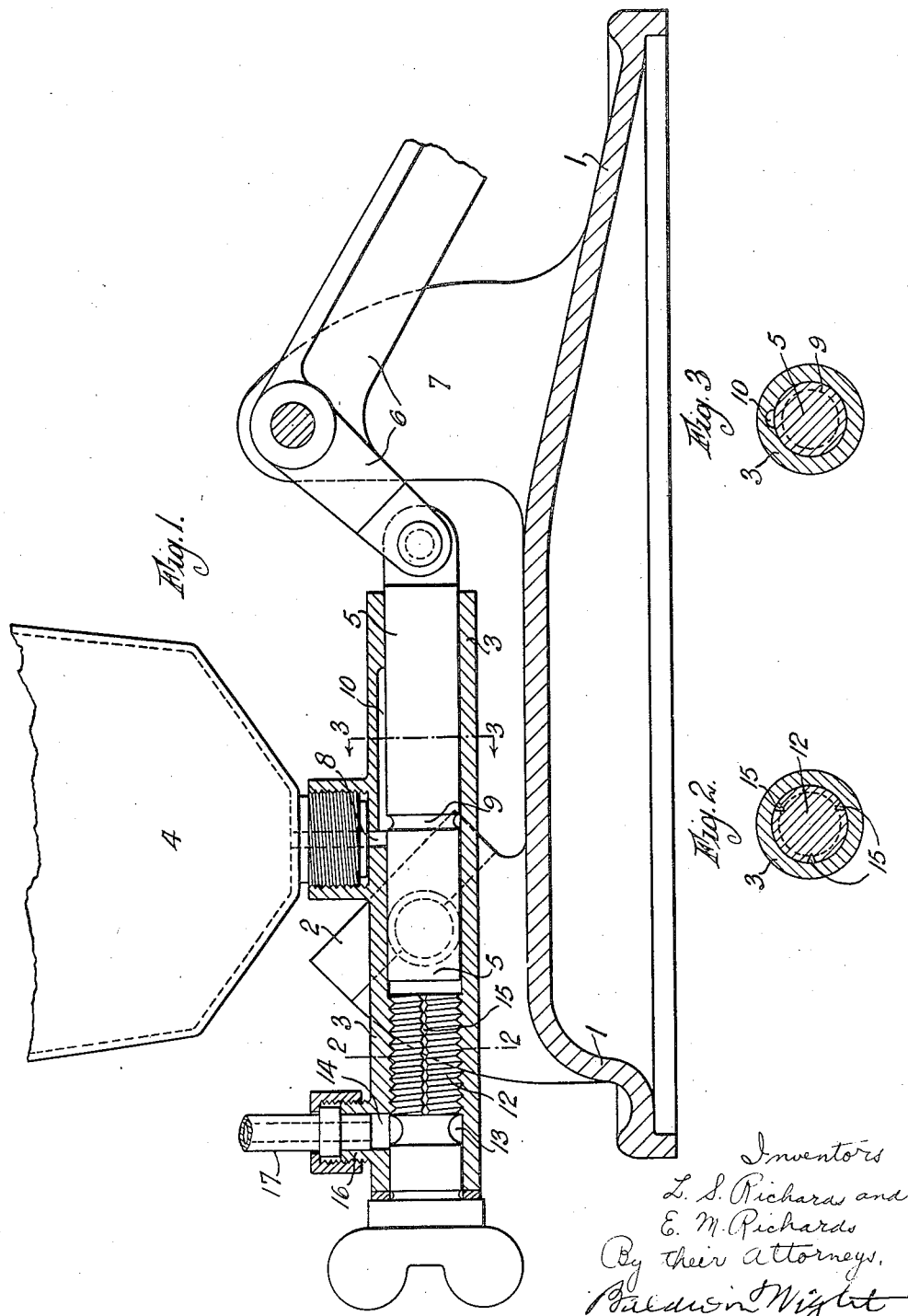

1,898,894

UNITED STATES PATENT OFFICE

LAURENCE SLOANE RICHARDS, OF LONDON, AND EVAN MATTHEW RICHARDS, OF BIRMINGHAM, ENGLAND, ASSIGNORS TO CREMAC MARKETING COMPANY, LIMITED, OF LONDON, ENGLAND, A COMPANY OF GREAT BRITAIN

APPARATUS FOR EMULSIFICATION

Application filed April 3, 1930, Serial No. 441,415, and in Great Britain April 4, 1929.

The invention relates to the class of emulsifying or homogenizing apparatus in which a piston is used to force the substances to be emulsified through a narrow aperture or passage.

The main feature of the present invention is the disposition of the parts in such a way that the emulsifying passage or passages, which are situated between the discharge and the pump cylinder, also constitutes or constitute means for preventing return to the cylinder of the emulsified substance, thus acting as a non-return valve.

Another feature of the invention is that the piston constitutes a pump piston and itself forms an inlet or cut-off valve.

The apparatus thus constitutes a pump having no moving valves. The piston fits the cylinder as tightly as is consistent with freedom of movement, and the invention includes means for preventing leakage past the piston and for returning the same to the pressure cylinder.

The emulsifying passage or passages may be formed in a screw plug closing the end of the cylinder, or in the cylinder itself, or they may be formed by obstructing the part of the cylinder between the piston and the outlet by balls, discs or other objects of a diameter nearly equal to that of this part of the cylinder, so as to leave a small clearance constituting the emulsifying passage.

In the accompanying drawing, which illustrates an embodiment of the invention, Figure 1 is a sectional elevation showing emulsifying passages in a plug at the end of the pressure cylinder; Figure 2 is a cross section on the line 2—2 of Figure 1, showing these passages; Figure 3 is a section on the line 3—3 of Figure 1, showing the arrangements for preventing leakage.

Referring to Figures 1, 2 and 3, a base 1 by means of bearings 2, one of which is shown, carries a cylindrical member 3 having its interior in free communication with a vessel 4 adapted to hold the substances to be emulsified—say, milk and melted butter. One end of the member 3 is bored to receive a piston 5 which fits it as tightly as possible, consistently with freedom to move. The piston is actuated by a bent lever 6 which is pivoted to it and is also mounted on the base 1 in bearings 7, one of which only is shown. When the piston is withdrawn as far as it will go, its inner end just clears the opening 8 in the vessel 4. The piston is annularly grooved at 9, and the annular groove is always, when the parts are assembled, in communication with a longitudinal groove 10 in the cylinder, which groove opens into the passage 8 leading from the vessel 4. The purpose of these grooves will be explained later. The member 3, near its end remote from the piston, is threaded to receive a screw plug 12 which is also recessed at 13, the recess coinciding with an outlet 14 when the plug is screwed home. The thread of the plug is notched at 15 as shown, so as to leave narrow emulsifying passages between the cylinder and the recess 13. The member 3 is provided with a neck 16 opposite the recess 13 adapted to receive a discharge pipe 17.

The action is as follows:—

The substance to be emulsified, for example, milk and butter, raised to a temperature sufficient to liquefy it, is introduced into the vessel 4, and the lever 6 is then raised. The notches 15 are sufficiently small to act the part of a non-return valve, and a partial vacuum is thereby created in the space between the piston 5 and the plug 12, which space then fills with the mixture from the vessel, the piston being arranged so as just to clear the passage 8 at the end of its outward stroke. On the inward stroke of the piston, the mixture is forced through the passages 15 and discharged in an emulsified condition through the pipe 17. Any of the mixture leaking backwards past the piston is caught by the groove 9 and returned to the working part of the cylinder through the groove 10.

The apparatus may be modified in various ways. For example, there may be one or as many emulsifying passages as are required, and any of these may be formed through the body of the closing plug, or through the wall of the cylinder or between the two. Or the emulsifying passages may be formed by balls, discs or other obstructions, situated in the cylinder between the piston and the outlet, and of diameter such as to leave a small clearance between their surface and the wall of the cylinder, so as to constitute an emulsifying passage. Similarly, with the leakage preventing devices, the necessary passages may be provided either in the piston or the cylinder, and they may be arranged so as to discharge into a sump instead of into the working cylinder.

It will be observed that the apparatus described above and shown in the accompanying drawing comprises a self-contained valveless emulsifying apparatus in which the emulsifying element and pumping element are combined into a single structure, which may be taken apart easily for cleaning.

What we claim is:—

1. Emulsifying apparatus comprising a cylinder having an inlet port for the substance to be emulsified situated between and at a distance from the opposite ends thereof, an obstruction having at least one restricted passage fitted at the discharge end of the cylinder, a tightly fitting piston adapted to reciprocate in one end of the cylinder and to cover the inlet passage at the commencement of its forward stroke and force the material to be emulsified through said restricted passage, said piston having a leakage recess, and said cylinder having a groove adapted to discharge matter leaking past the piston.

2. Emulsifying apparatus as in claim 1 wherein the obstruction consists of a plug screw threaded into the cylinder, the screw threads of the plug being cut away so as to form the said narrow passage.

3. A self-contained valveless emulsifying apparatus in which an emulsifying element and a pumping element are combined into a single piece of apparatus adapted to pass the substance to be emulsified only once through the emulsifying element and in which the number of moving parts is reduced to a minimum, comprising the combination of a supply reservoir for the mixture to be emulsified, a pump cylinder having a port towards its outer end in valveless communication with the supply reservoir, a piston fitting tightly in the cylinder, a stationary emulsifying element at the inner end of the cylinder having such a fine discharge passage as substantially to prevent return of emulsion therethrough, and means for reciprocating the piston between a position near the emulsifying element and a position in which it uncovers the port, said piston constituting the sole means for forcing the material through said discharge passage.

4. In emulsifying apparatus in which an emulsifying element and a pumping element are combined into a single piece of apparatus adapted to pass the substance to be emulsified only once through the emulsifying element and in which the number of moving parts is reduced to a minimum, the combination of a supply reservoir for the mixture to be emulsified, a pump cylinder having a port towards its outer end in valveless communication with the supply reservoir, a piston fitting tightly in the cylinder, a stationary emulsifying element at the inner end of the cylinder having such fine passages as substantially to prevent return of emulsion therethrough, and means for reciprocating the piston between a position near the emulsifying element and a position in which it covers the port, said piston having a leakage recess and said cylinder having a groove adapted to discharge matter leaking past the piston.

5. A self-contained valveless emulsifying apparatus in which an emulsifying element and a pumping element are combined into a single piece of apparatus adapted to pass the substance to be emulsified only once through the emulsifying element and in which the number of moving parts is reduced to a minimum, comprising the combination of a supply reservoir for the mixture to be emulsified, a pump cylinder having a port towards its outer end in valveless communication with the supply reservoir, a piston fitting tightly in the cylinder, a stationary emulsifying element in the form of a plug screw threaded into the inner end of the cylinder and having at least one groove cut across the threads to form such a fine passage as substantially to prevent return of emulsion therethrough, and means for reciprocating the piston between a position near the emulsifying element and a position in which it uncovers the port, said piston constituting the sole means for forcing the material through said groove.

6. A self-contained valveless emulsifying apparatus comprising in combination a cylinder, a piston relatively reciprocable therein, a vessel for containing material to be emulsified, an inlet passage for affording communication between said vessel and said cylinder and being adapted to be opened and closed by said piston, and a discharge port in said cylinder and being of such small area as substantially to prevent return of material therethrough to said cylinder, said piston constituting the sole means for forcing the material through said discharge port.

In testimony that we claim the foregoing as our invention we have signed our names this 25th day of March, 1930.

LAURENCE SLOANE RICHARDS.
EVAN MATTHEW RICHARDS.